United States Patent [19]
Wanzenberg

[11] 3,819,363
[45] June 25, 1974

[54] METAL RECOVERY METHOD

[76] Inventor: Fritz Walter Wanzenberg, 9 Campbell Ln., Larchmont, N.Y. 10538

[22] Filed: Apr. 7, 1971

[21] Appl. No.: 132,061

Related U.S. Application Data

[63] Continuation-in-part of Ser. No. 49,455, June 24, 1970, abandoned.

[52] U.S. Cl............................ 75/118, 75/83, 423/23
[51] Int. Cl............................................ C22b 11/04
[58] Field of Search........................ 423/22-24, 423/26; 75/83, 118

[56] References Cited
UNITED STATES PATENTS

| | | | |
|---|---|---|---|
| 497,014 | 5/1893 | Cleghorn | 204/109 |
| 1,377,554 | 5/1921 | Bloom | 204/164 |
| 1,941,914 | 1/1934 | Rodrian | 204/109 |
| 2,221,018 | 11/1940 | Bachman | 423/23 |
| 2,944,886 | 7/1960 | Fisher et al. | 75/83 |
| 2,979,449 | 4/1961 | Sheer et al. | 204/164 |
| 3,055,754 | 9/1962 | Fletcher | 423/24 |
| 3,202,281 | 8/1965 | Weston | 423/26 |
| 3,474,015 | 10/1969 | Norris | 204/151 |
| 3,476,663 | 11/1969 | Norris | 75/118 |
| 3,639,925 | 2/1972 | Scheiner et al. | 75/118 |

Primary Examiner—F. C. Edmundson

[57] ABSTRACT

A system for recovering noble metal values from chemically composite ore materials. The process is effective to assay as well as to remove commercial quantities of precious metals associated chemically or physically with naturally occurring organic compounds. For example, previous metals which are chelated or are present in the form of complex ions, as well as metals which are physically or chemically bound to or form parts of large organic molecules may be recovered. The starting material may be an ore including water and organic and inorganic underwater deposits, usually from coastal regions. The organic portion of the ore is separated by flotation from the shells, sand, and the like. Calcium carbonate is removed by acid treatment, and the remaining organic float material is treated with a water-immiscible, volatile organic solvent or other material which forms a gel-like material. The solvent, such as benzene or the like, is then reclaimed by heating the mass below the boiling point of water. Thereafter, the precious metal containing composition material is treated with a strong oxidant such as perchloric acid, any excess oxidant is removed from the oxidized compositie material, and the organic precious metal composite material spontaneously ignites at about 200°C., producing waste gases and an ash material. The ash contains mixed previous elemental metals and metal oxides salts and slags which are suitable for immediate electric arc furnace reduction in preparation for the formation of cast anodes from which pure metals are ultimately recovered.

In other embodiments, additional combustible material is added to or burned with the composite material. In other embodiments, portions of the initial separation of the composite material is accomplished with the aid of surface active agents, or with ultrasonic energy, or both. In some instances, the composite materials are separated from one another by metal types prior to metal recovery.

4 Claims, 6 Drawing Figures

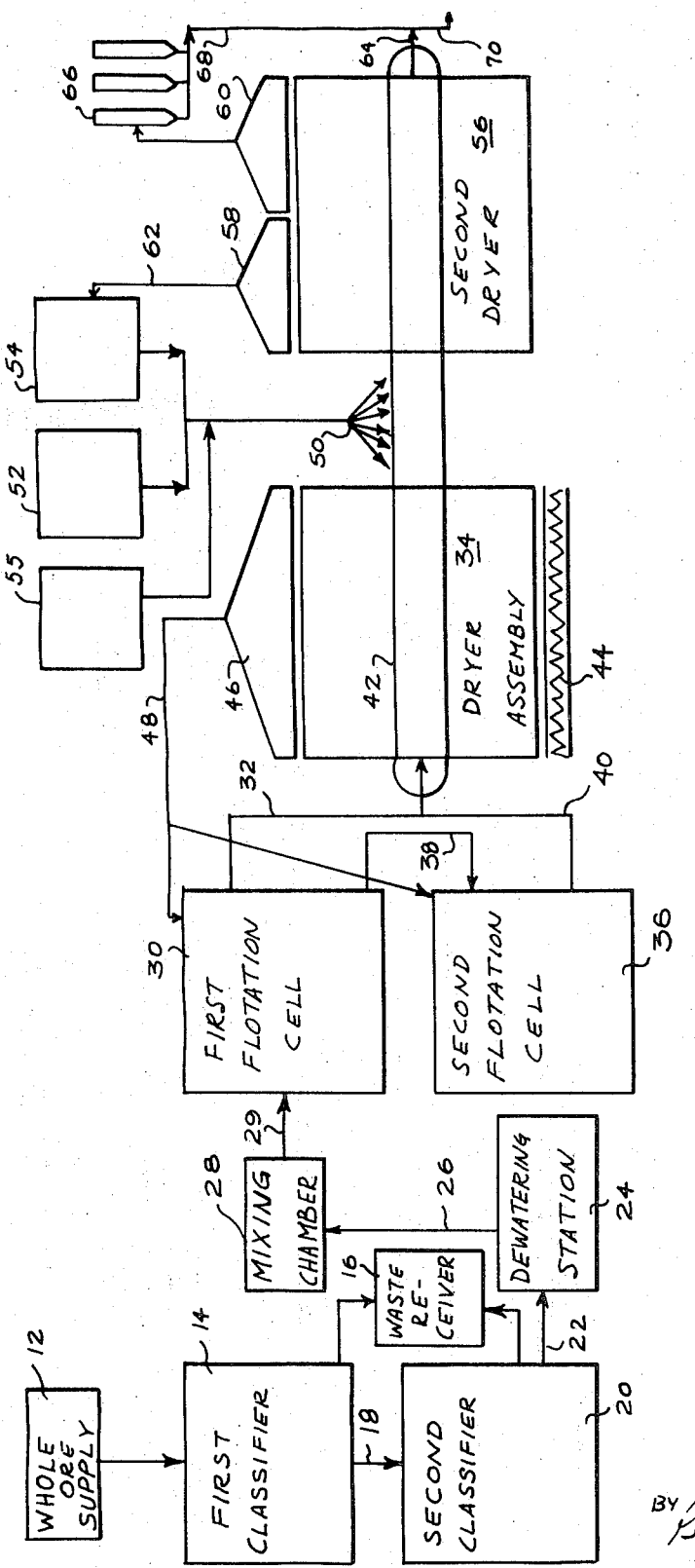

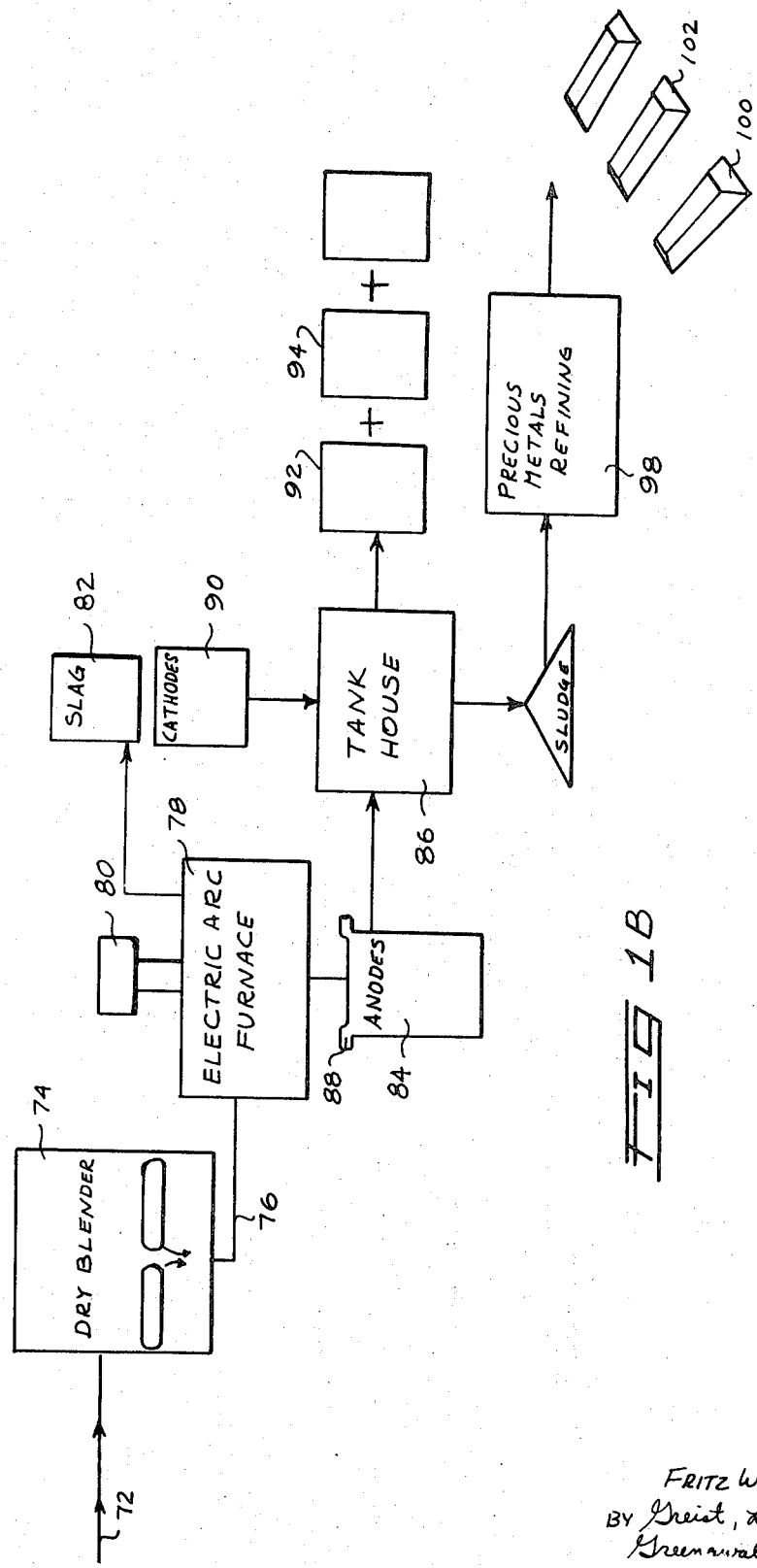

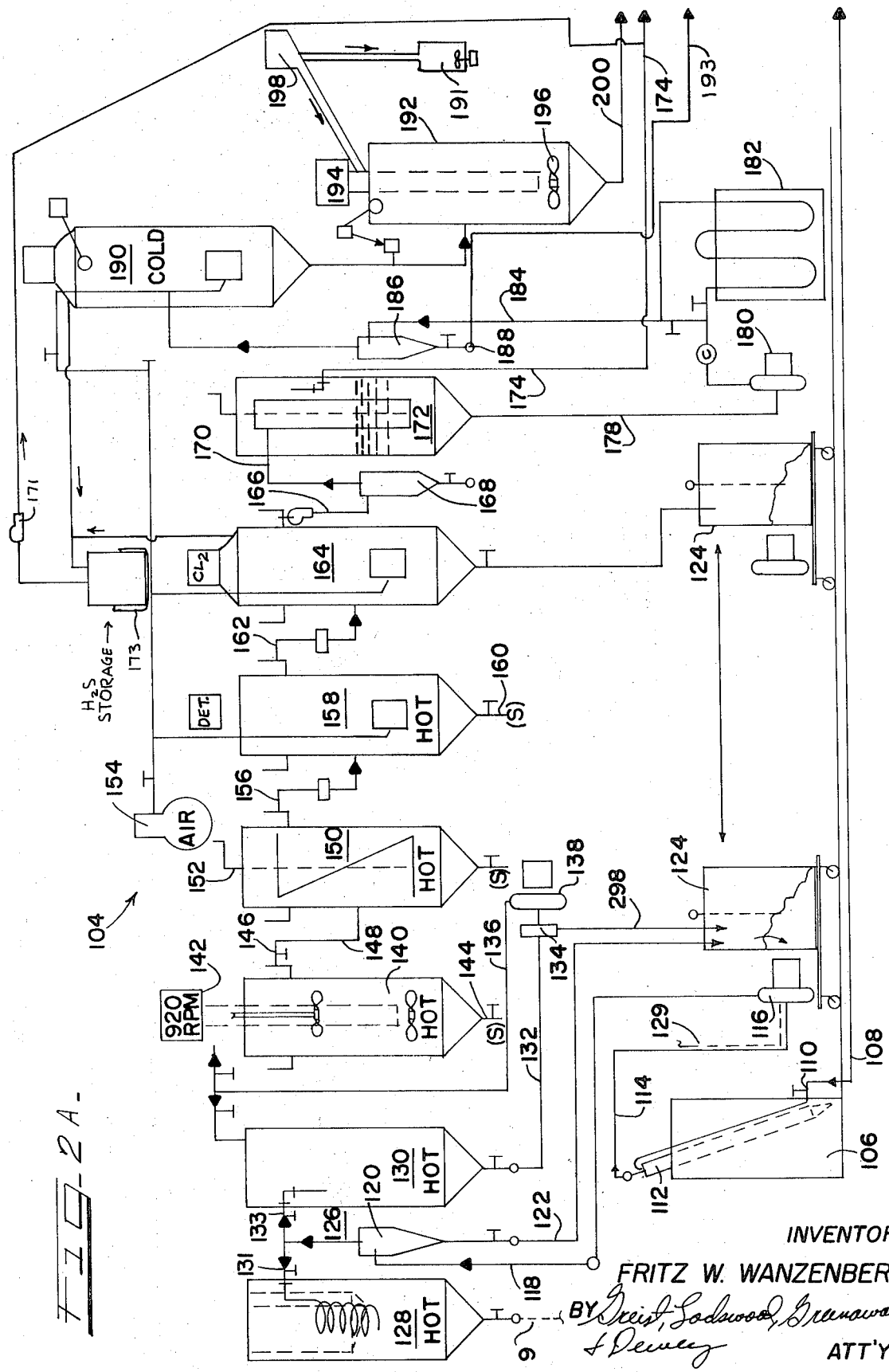

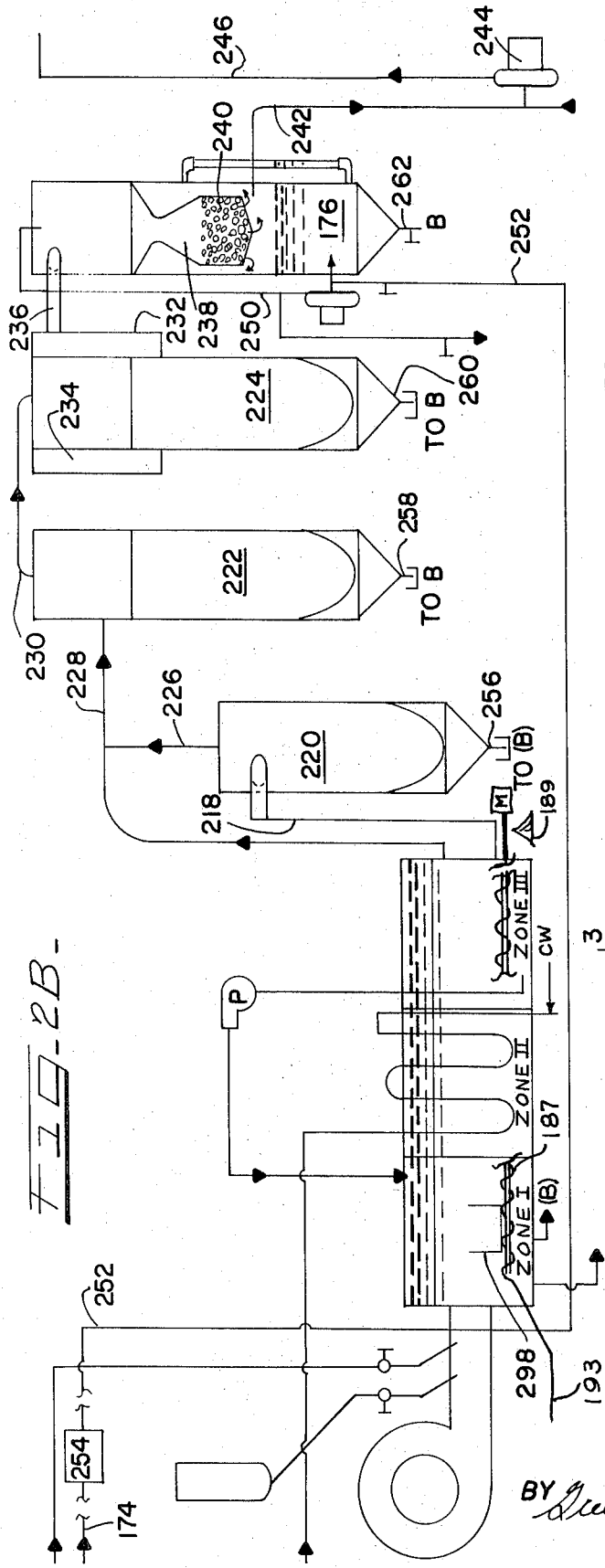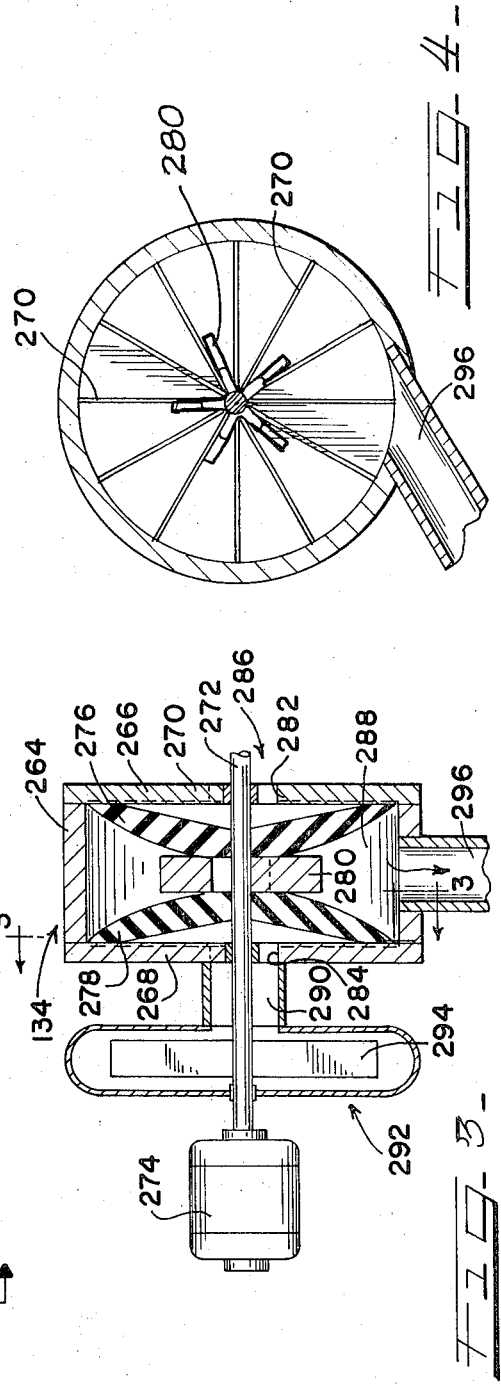

METAL RECOVERY METHOD

BACKGROUND OF THE INVENTION

This application is a continuation-in-part of my earlier filed application Ser. No. 49,455, filed June 24, 1970 and entitled "Metal Recovery Method", now abandoned.

The present invention relates to methods for mineral recovery, and in particular, to methods wherein precious metal values which are present in composite form in underwater offshore deposits which are principally organic silts and the like. The values are recovered by separating the composite metal and organic materials which comprise the submarine silts from the sand and shells also present therein, removing the calcium carbonate therefrom, frothing the material in an aqueous medium, forming an organic gel or the like from the organic composite material by addition thereto of a volatile, water-immiscible solvent, removing part of the water and substantially all of the solvent, strongly oxidizing the residues, removing excess oxidant and permitting spontaneous ignition of the composite material to eliminate the organic portion thereof and produce an ash comprised of noble metal oxides and slags. The ash is suitable for electric arc furnace treatment in the presence of a reducing agent to form precious metal anodes from which the metal is ultimately recovered in a known manner.

The same general results may be brought about by the substitution of certain steps for those referred to above at various stages in the process, with the use thereof depending on certain variables which will be set forth in further detail herein. These include methods of separating the inorganic material from the composite material and the manner in which combustion or ignition of the composite material takes place.

Although it is well known that sea water contains noble metal values which may be recovered, and although it is believed that silt and other submarine deposits, as well as landlocked sedimentary carbonaceous deposits, include noble metal values, particularly gold, silver and platinum, especially when such silts or deposits are from certain geographic regions, some techniques for evaluating the amount of precious and other metals present have often, by their nature, either destroyed or masked the presence of such materials or rendered it difficult to determine accurately the amounts of such materials actually present. In other words, the assaying techniques used have often either been based on the assumption that the precious metals were present in some particular form, which has not always been the case, or have been based on the assumption that such metals, if present, would undergo certain characteristic chemical reactions. However, it has been found that certain of these assumptions and theories have been fallacious, and, as a result, noble metals have escaped notice when the ore material in question has been analyzed with a view toward detecting the material.

In other cases, although the presence of gold or other valuable metal could be established, the techniques suggested for use in recovering the metal were similar in concept, if not in execution, to the methods used to determine the presence of the noble metals. Consequently, since a number of prior art processes of assaying were not economically feasible for commercial production, recovery of metal values, even of metal values known to be present, was not attempted, or, if attempted, was not successful.

The present invention, on the other hand, is based in part upon the assumption that many precious metal values are present in certain ores, including underwater silty organic residues and inland sedimentary deposits, in forms which, if not actually chemically or physically precise forms of complex organic compounds, are at least functionally present in such compounds and can therefore be recovered by an appropriate process rather than in large part escaping detection and/or recovery.

Accordingly, in view of the general state of the prior art of precious metals recovery, and particularly in view of the drawbacks associated with prior art efforts to recover noble metal values from underwater and other sedimentary deposits, it is an object of the present invention to provide an improved precious metals recovery method.

A further object is to provide a metal recovery method in which underwater deposits are separated into noble metal-bearing components and waste components and in which the metal-bearing components are initially washed or treated with a water-immiscible, low boiling point organic solvent.

Another object is the provision of a method in which a metal-bearing composite material separated from a mixture of sea water and waste material is recovered in a form suitable for subsequent treatment by formation thereof into a gel-like material from which the carbonate content has been removed, and thereafter by removing the water-immiscible, low boiling point organic solvent portion from the gel-like material.

Another object is the provision of a method wherein a partially dried, noble metal-containing composite material is treated solely with a strong oxidizing agent, or with a strong oxidizing agent in the presence of a minor portion of nitric acid.

A still further object is the provision of a metal recovery method in which oxidized composite material having a noble metal component and an organic component is treated to remove excess oxidizing agent, and thereafter at an only moderately high temperature, spontaneously ignites and burns to form an ash containing recoverable noble metal oxides suitable for eventual recovery of metal therefrom.

Another object of the invention is the provision of a method in which the combustion products of a burned and oxidized composite, precious metal-containing material may be recovered for subsequent treatment and in which such materials comprise valuable metal oxides plus a slag material rendering them suitable for simple subsequent treatment to recover the metal therefrom.

A further object of the invention is the provision of a method for treating a floating constituent of an ore material with a water-immiscible, low boiling point solvent, in which the water supporting the composite material layer is slightly acidified, in which a significant portion of the solvent is recovered in a dryer, in which the remaining material is treated with a strong oxidizing agent, in which the excessive oxidizing agent is thereafter removed and in which the thus treated material spontaneously ignites and the residue, both coarse and flyash material, is collected for reduction to elemental metal form.

A further object is the provision of a method in which only minimum quantities of reagents, such as cyanides may be avoided and a method in which the materials are economical and easy to obtain.

A still further object is the provision of a method which is applicable making use of flotation separation of metal-containing composite materials from inorganic wastes, acid treatment of the materials and the water therebeneath, solvent treatment of the material, and utilizing a dryer for recovering the solvent, a spraying unit or the like for oxidizing treatment of the composite material, and a dryer and ignition unit for recovering excess oxidizing agent and certain combustion products of the treated composite material, as well as a conveyor or the like for moving the material from one station to another, and means for recovering the combustion products of the material for further treatment thereof.

A still further object is to provide a method of concentrating valuable metal-containing chemically composite materials prior to treatment thereof for recovery of the metal values therefrom.

Another object is to provide a method of concentrating the composite materials before processing thereof by means of successively treating the same in presence of water with various detergent materials in a desired sequence, following which the composite material is flocculated and collected in a concentrated form for further treatment.

A still further object is the treatment of the composite material and the remainder of the ore with detergent materials in a predetermined sequence, while, at the same time, mechanically agitating the mixture to accelerate the rate of separation of inorganic materials from the composite material.

A further object is to provide a method of recovering metal values from chemically composite materials which includes collecting the residues from the combustion of the composite organic materials, and separating the metal values from one another either by first separating the oxides from one another or by reducing the oxides as a group and subsequently separating the metals from one another following the reduction of the oxides to elemental metal form.

Another object is to provide a method of recovering valuable metals from composite materials and which provides for forming composite materials adapted to undergo combustion under controlled oxidizing conditions, but which utilizes a minimum proportion of expensive oxygen-bearing compounds.

Another object is to provide a method of recovering metal values which includes preliminary separation of an organic or composite pulp from entrained or associated inorganic materials, by applying ultrasonic energy to a mixture of such organic, inorganic, and composite materials and water.

Another object is to provide a method of recovering metal-containing residues from combustion which includes treating a composite material with an oxidizing agent and a fuel material, and burning the composite material, the oxidizing agent and the additional fuel simultaneously in the presence of air under controlled conditions.

Another object is to provide a method wherein composite, noble-metal containing materials may be treated by the addition thereto of combustible organic products, and wherein the composite materials and the added combustible products may be oxidized together, with a part of the oxygen for combustion being supplied from oxygen-bearing treating compounds and the remainder from the atmosphere in which combustion takes place.

Another object is to provide a method of controlling the combustion of noble metal-containing composite materials so as to minimize the production of refractory products and maximize the yield of reducible, unprotected oxide products resulting from controlled combustion of the composite materials.

A further object is the provision of a method of burning together valuable-metal-containing composite materials and associated fuels, where necessary, so as to minimize the production of unoxidized, high temperature resistant materials created by the combination of unduly high localized combustion temperatures and insufficient oxidizable materials and/or oxidizing agents.

These objects, and other inherent objects and advantages of the invention are attained by separating the chemically composite materials from associated ore material, including inorganic components, treating the composite materials with an oxidizing agent, causing combustion of the oxidized composite materials, with or without the addition of further fuel components, and collecting the solid combustion residues of said materials for subsequent collection or reduction to the noble metals which formed the noble metal constituent of said composite materials. The manner in which this inveniton achieves its objects, and other inherent objects and advantages, will become more clearly apparent when reference is made to the accompanying detailed description of the preferred embodiments of the invention, and to the drawings forming a part hereof, in which like reference numerals indicate corresponding parts throughout.

BRIEF DESCRIPTION OF THE DRAWINGS

FIG. 1A is a block diagram showing a portion of an apparatus which may be used to practice the method of the present invention, and illustrates certain steps of the method;

FIG. 1B is a block diagram illustrating the remainder of the apparatus which may be used to carry out the method of the present invention, and shows other steps of the method described;

FIG. 2A is a block diagram showing a portion of another form of apparatus which may be used to practice the method of the present invention, and illustrates certain steps of the method;

FIG. 2B is a block diagram illustrating the remainder of the apparatus of FIG. 2A, and shows other steps of the method therein illustrated;

FIG. 3 is a vertical sectional view of a form of transfer pump useful in performing one type of preliminary separation step used in the method of the invention; and FIG. 4 is a sectional view showing the pump of FIG. 3, taken along lines 4—4 thereof.

DESCRIPTION OF THE PREFERRED EMBODIMENTS OF THE INVENTION

Before referring in detail to illustrative embodiments of the invention, it should be understood that, for reasons which will be set forth in greater detail herein, some of the terms used herein to designate the materials and methods are terms whose meanings are those defined herein and which will be understood from the context herein to refer more to the functional properties and aspects of the methods than to chemically precise definitions or characteristics of the materials or methods.

For example, the material from which the values are recovered is referred to generically as a composite material since its exact nature may not be known, because it may not be any particular material or mixture thereof, and because several otherwise different materials might, for purposes of the invention, be similar or the same although they may be quite different for other purposes. Likewise, by way of example, certain treating materials may be referred to as solvents or the like, although their use in the method may not necessarily involve causing solution of other elements, as will more fully appear. It will likewise be understood that substitutions may be made for many if not all of the forms of apparatus described without sacrificing functions or results, as will be apparent to those skilled in the art. Certain examples of these substitutions will be referred to elsewhere herein.

Referring now to FIG. 1A in greater detail, a portion 10A of the apparatus is shown to include means 12 for supplying whole ore and a first separator 14, preferably a vertical classifier, which receives ore input and diverts the sand and shells and some water to a waste receiver 16, directing the remaining portion of the input through a conduit 18 to a second classifier 20. In this connection, it will be understood that the invention herein is illustrated in relation to an embodiment wherein the noble metal values are contained in underwater, generally solid deposits lying on or forming the bottom of a body of water. Therefore, the terms "ore" or "whole ore" as applied to underwater materials are intended to encompass solid and semi-solid material as well as the water associated therewith. It is not necessary that the ore be of underwater origin, however, and therefore, unless otherwise indicated, the term "ore" when only generally used herein is intended to include both solid material as well as solid material mixed with water, and to include materials deposited on dry land as well as those of submarine origin.

EXAMPLE 1

Referring again to the vertical classifier or like separator 14, it will be assumed that whole ore is being delivered thereto, and that the shells and sand therein are typically separated by velocity separation in a known manner. The makeup of the effluent from the separator 14 ordinarily comprises about 10 percent solids. The second classifier 20 provides some additional separation of sand and shells from the whole ore material and also is of a conventional construction. In this case, however, additional water is provided to maintain the effluent at a solids content of about 10 percent. From the second classifier 20 the ore passes through conduit 22 to a dewatering station where the solids in the mixture are concentrated to a level of about 30 percent. Dewatering is controlled and salt water is recycled, resulting in salt content of the organic pulp float in excess of 22 percent, more or less, as desired.

The resulting material, somewhat in the nature of a pulp, is then passed through conduit 26 to a mixing chamber 28 where, preferably with substantial agitation, a minor amount of hydrochloric acid is added, for example, three pounds per ton of dry solids. The principal reaction taking place as a result of this treatment is the formation of gaseous carbon dioxide and calcium chloride from whatever calcium carbonate is still present in the mixture. Conduit 29 then delivers the liquid material to a first flotation cell 30, which includes impellers of a known type, and a weir disposed along a substantial length of one edge portion in a manner well known in the art. In the first flotation cell 30, a low density, substantially water immiscible, low boiling point (or end point in the case of liquids not having a clearly defined boiling point) organic material is added, typically in the amount of one pound per ton of dry solid material. In this particular example, benzene (b.p. 80.3° C.) is used. The "float" or frothy pulp from the first flotation tank is collected from the weir and directed by way of conduit 32 to a dryer assembly 34, while the other or "sink" portion is delivered to a second flotation cell 36 via conduit 38, * i.e., original salt in seawater is around 3.5 percent. By controlled recycling, evaporation, this can be raised to 22 percent. The second cell 36 is constructed and arranged in the same manner as the first flotation cell, and the output thereof, after similar treatment with benzene, passes over the weir and is delivered by way of conduit 40 to the dryer assembly 34. In use, about 90 percent of the values are normally contained in the float from the first cell 30, and about 10 percent of the values only are recovered from the float of the second cell 36. From this, it is clear that one flotation cell only may be used, if desired, or that a more extensive extraction or separation can be performed using two more flotation cells, if believed desirable or necessary.

The principal action taking place in the flotation cells 30, 36 is the "sink" or settling of the more dense portions of the mixture supplied thereto, whereas the principal action of the mixer is the thorough agitation of the acidified, water-including or whole ore. Therefore, the action of the flotation cell is principally that of settling rather than that of frothing. In this connection, it will be appreciated that in the present invention, the organic liquid or solvent serves to strip away shells, sand and other inorganic material bound to the "float" so that it may settle in the cells. This action is in contrast to some frothing or flotation techniques wherein the flotation results from the attraction of oils to the sulfur-containing or sulfide portions of the organic constituents. The benzene or other solvent also provides an interfacial action resulting in an effect analogous to the foaming caused by a detergent, and thereby additionally helps keep the desired phases floating on the water, substantially free of inorganic matter. The frothy pulp material to be passed through the dryer unit 34 is deposited on the upper run of a conveyor 42, the conveyor preferably being a pan type unit in which the pans are made of a non-metallic material such as porcelain, glass, or a high temperature resistant, relatively inert plastic material. The dryer unit itself includes a main housing 42, indirect heating means schematically shown at 44, and a hood 46 to which is attached a condensing line 48 adapted to recover and return the benzene or other volatile material to a reservoir (not shown) from which it may be recirculated to the two flotation cells 30, 36. The interior of the dryer 34 is maintained at a temperature sufficient to evaporate the benzene or other low boiling solvent in large part without removal of all or most of the water. Although a certain portion of water is removed from the pulp by this drying, a certain amount remains, including adsorbed or chemically bound water. The pulp emerging from the dryer 34 therefore has a damp, absorptive texture.

Adjacent the exit of the dryer 34 a sprayhead 50 is provided to spray perchloric acid from a perchloric acid generator 52 or a perchloric acid storage tank 54 onto the pulp disposed on the conveyor 42 and emerging from the dryer 34. This treatment is carried out using a fine sprayhead and preferably using perchloric acid in a 60 percent concentration by weight. A nitric acid supply 55 is provided so that about 0.1 percent nitric acid may be mixed with the perchloric acid prior to spraying thereof. Although the nitric acid is not strictly necessary, its presence is though to assist in producing oxidizing gases or ions. The fine spray of perchloric acid is rate regulated according to the amount and content of pulp present, with a slight excess of acid being used to insure complete oxidation of all oxidizable organic materials present.

After the perchloric acid treatment, the pulp material is introduced into a second dryer 56 which includes heating means (not shown) for the pans on the conveyor 42, a first hood 58 for perchlorate recovery, and a second hood 60 for dust collecting, disposed downstream of the first hood 58. Preferably, the second dryer 56 is maintained at temperature of about 210° C., which is sufficient to remove any unreacted perchlorate or its by-products, to remove water, and to remove any other volatile constituent of the material being treated. After the perchlorate evaporation and the recovery thereof through the conduit or line 62 to the storage area 54, the remaining dried material is in a spontaneously combustible form, and the material will ignite after drying, even in the absence of flame, starting at about 210° to 250° C.. As the upper run of the conveyor proceeds to the outlet area 64 of the second dryer 56, the material completes its burning and may be recovered. In this connection, it is preferred that the material be so arranged on the conveyor, and the conveyor operated at a speed such that the progress of the flame front in a direction opposite that of conveyor pan movement is just offset by the rate of forward conveyor pan movement. In this manner, the burning is localized beneath the hood 60.

The character of burning of this oxidized composite residue is such that a significant amount of flyash is created, and this ash is recovered in a bag house schematically represented at 66, whereas the non-metallic gaseous combustion products such as $H_2O$, $CO_2$, etc. are not recovered. Burning temperature itself is in the region of 2,000° C., and the flame is an intense white flame similar to that seen in the thermite reaction or in a magnesium flame.

A conduit 68 is provided to collect and return the dust from the bag house 66 to a collection area schematically shown at 70, where the residual solid, dust, powdered or fused material is dumped from the pan conveyor 42, so that all non-volatile combustion products coming from the second dryer 56 are collected substantially in their entirety. The residue is comprised of noble elemental metals, metal oxides, and salts, and base metal oxides, and slag material, including silicates of manganese, alminum, uranium, etc.

Referring now to FIG. 1B, another portion of the apparatus 10B is shown to include a conduit 72 for directing the slag and noble metals, metal oxides and salts emerging from the second dryer 56 to a dry blender 77 where a reducing agent, for example, powdered coal, is provided so as to furnish, as an example, 6½percent fixed carbon in relation to the weight of noble and base metal oxides and salts in the ash which comprises the slag and metal oxides. In this connection, it will be realized that, depending on the proportions to each other of each of the noble and other metals present, and depending upon the percentage of metal oxides in the ash as a whole, the actual amount of carbon available for reduction will vary. With another typical sample ore comprising underwater silts and the like, the mix of gold, silver, platinum, palladium etc. was such that about 11½ percent of the metal oxides by weight was oxygen with the remainder being metal; therefore 11 percent active reducing agent is sufficient to remove or replace the oxygen present for permitting elemental metal recovery.

After thorough mixing of reducing agent and ash material in the dryer blender 74 and then briquetting in a manner well known to those skilled in the art, the ash and reducing agent "bricks" are passed through a conduit 76 to an electric arc furnace 78 from which the elemental metal is recovered, normally in the form of cast anodes suitable for subsequent refining. An incidental, advantageous effect of the inclusion in the arc furnace mix of the slag is that it serves as a protective flux for the material in the furnace, and facilitates maintenance of the electric arc which is necessary to melt the mix to recover the elemental metal material. As will be understood by reference to FIG. 1B, the arc furnace is supplied from a conventional power source, diagrammatically shown at 80, and a stock pile 82 is provided for storage of excess slag which is continuously removed from the arc furnace once it is in operation. If desired, the slag may be further processed for recovery of metal values therefrom, such slag, as pointed out above, commonly comprising silicates of aluminum, magnesium and manganese, rare earth metals and uranium.

The metal recovered from the arc furnace may be cast in the form of thin sheets 84 to be used as anodes in a tank house 86 of a well known type, and for this purpose, handling ears 88 may be cast thereon. The materials comprising the anodes are principally gold, silver, platinum and palladium, but also includes copper, zinc, and uranium, iron, etc.

The operation of the tank house is conventional and includes a bath of the desired type for passing current from the so called cathode starting sheets 90 to the anode sheets 84, the sheets being passed through the solution in sequence in a facing relation to adjacently disposed cathodes, with current passing therebetween through the solution to purify a given metal on the cathodes and ionize other metals for passage into solution, either to be plated out at another cathode or to be collected as an elemental metal sludge at the bottom of the tank. The product from the tank house includes cathodes 92, 94, etc. of relatively pure, easily plated out material such as copper, zinc, etc. The sludge 96 collected from the solution comprises the previous metals which, having been separated from the anodes in which they were cast, may be treated in a precious metal refinery 98, the output of which is schematically illustrated as bars 100, 102, etc. of gold, platinum-palladium and silver, for example.

EXAMPLE 2

A process substantially as described in Example 1 was carried out, except that, instead of the benzene being used to treat the material floating on cells 30, 36 and resulting from the slight acidification of the frothed or aerated, 30 percent solids mixture, methyl isobutyl ketone ("MIBK") was used. This material worked with approximately equal effect in relation to the benzene used in Example 1, and was recovered in the same way. The process was otherwise carried out in the same way. MIBK is more expensive, however, than benzene, but it performs its cleaning and separating function well and is easy to recover.

EXAMPLE 3

The process was also carried out without the addition of the trace amounts of nitric acids which were used in Example 1 for treatment at the same time the perchloric acid is sprayed onto the composite solvent treated material emerging from the first dryer 34. Although it is believed that the rate of oxidation may have been somewhat adversely affected by the absence of the nitric acid, the perchloric acit treatment step is nevertheless effective alone to produce a material which is suitable for perchlorate recovery, drying, and spontaneous ignition in the second drying oven.

EXAMPLE 4

The process of the invention may be carried out as in any one of Examples 1–3, differing therefrom only in that a single flotation cell 30 is used to separate the float emerging from the mixer from the sink portion after treatment of the float with the water immiscible, volatile organic material such as the benzene, the MIBK, or its equivalent. The use of the method may result in a somewhat decreased yield, but a principal portion of the values may nevertheless be recovered using the single flotation cell 30 only.

EXAMPLE 5

A metal recovery operation may be carried out as set forth in any of the foregoing examples, except that, when the dust collected from the bag and the powder or other like material emerging from the second dryer are combined prior to being added to the electric arc furnace, another carbonaceous material, such as a petroleum coke, may be used as a partial or complete substitute for the powdered coal referred to in Example 1. Calculations of the desired amount are made on the basis of the amount of carbon which will be necessary in view of the amount of oxygen present in the metal oxide portion of the metal-containing mixture and the relative proportion of each metal oxide in the mix, all as set forth in the discussion of the method of Example 1.

EXAMPLE 6

The process may be carried out using another generally water immiscible, low boiling point organic material, such as, in this case, a petroleum naptha. The results obtained will also be satisfactory by using this material as a complete substitute, or as a partial substitute, for the benzene or ketone cleaning materials referred to in the above examples.

EXAMPLE 7

The process may be carried out using another solvent of the water immiscible, low density, volatile type, such as gasoline, which may be substituted wholly or in part for the benzene or other solvent referred to in any of the above examples, without substantial loss of effectiveness.

EXAMPLE 8

An operation was carried out as in any of the above examples, except that, in the first drying operation, a vacuum dryer using low temperature evaporation was used in place of the ordinary drying oven 34. The results were approximately the same as the results of the other processes described herein.

EXAMPLE 9

Various operations were carried out as in any of the foregoing examples, however, the oxidizing agents used, instead of the perchloric acid, were any of the following in suitable form, used as set forth herein and in a manner well known to those skilled in the art:

Ozone, sodium or calcium hypochlorite, various permanganates, other perchlorates, chlorates, and oxygen. Although all of these materials may be made to operate with the present invention, and although fluorine may be made to operate, and is an excellent oxidizing agent, the perchloric acid is preferred, since it combines the advantages of reasonable cost, stability, lack of corrosiveness when properly used, freedom from toxicity, ease of handling, and other considerations, including the ability to be used in aqueous solution.

EXAMPLE 10

A process having certain steps in common with the process described in the foregoing Examples 1 through 9, inclusive, but also having certain different and additional steps, was carried out. In carrying out this process, which will be described in connection with a description of the apparatus used to perform the process, a form of apparatus was used which also differed in some respects from that shown in FIGS. 1A and 1B, but which was similar thereto in other respects.

Referring now to FIGS. 2A and 2B, this apparatus is designated 104A and is illustrated somewhat schematically. As in the above examples, the method was directed to recovering metal values from sedimentary material such as submarine silts or the like. For purposes of illustration, it will be assumed that the whole ore, containing more or less water, but typically of about 70 percent solids conncentration by weight, is disposed in a supply drum 106 served by a hot water line 108, flow through which is controlled by a valve 110. Water admitted by opening valve 110 passes through sleeve 112 with ore being thereby removed through line 114 from the drum 106 and supplied to the pump 116, from which it moves through line 118 to a hydrocyclone 120 where a preliminary separation of inorganic material and organic material takes place. Drain line 122 directs sands, shells, and the like to a partitioned storage bin 124, while line 126 directs the float or froth of organic material, and composite material, and a certain amount of entrained inorganic material to either a washing tank 128 or to a mixing tank 130. Line 129, shown in phantom, is provided for recirculation through pump 116. Manipulating valves 131, 133 permits control of these steps.

Assuming that the material exceeds a desired solids concentration, such as more than 60 percent, it is elutriated in tank 128 to a 45 percent or less solids content using hot sea water, preferably water kept at about 80° C. Thereupon, the material is transferred to mixing tank 130, which is preferably maintained at about 80° to 90° C., wherein a preliminary separation of fats, carbohydrates, and proteins from the sand is carried out by partial digestion of the organic material with amylase or a similar enzyme in the amount of about ½ pound per ton of dry solids. This cleaned, inorganic material is relatively coarse and may be collected and removed on a 0.1 mesh screen and thereafter discarded.

Next, a 50 percent – 50 percent mixture by weight of an anionic detergent and a non-ionic detergent are added to the mixture in the same tank 130 in the ratio of 1 pound of mixed detergent per ton of dry solids to assist in cleaning the sand and shells and separating them from the organometallic constituents of the material. In this sense, the expression "organometallic" is used in its broadest sense to include any organic compound having precious metals associated or combined therewith in any way, and is not limited to meaning compositions with a direct carbon-to-metal bond. A complete separation is assisted by passage of this material through the line 132 to a separator 134 shown in detail in FIGS. 3 and 4, the operation of which will be described in greater detail herein. For the present, it will be assumed that the mechanical action of the separator 134 is sufficient to eliminate a certain proportion of sand, shells, and the like, from the composite material by mechanical scrubbing or cleaning action. In tank 130, a modifier may be used to clean organic material from the surfaces of the inorganic particles. This etching modifier may consist of ½ pound of hydrochloric acid (HCl) and ¼ pound of hydrofluoric acid (HF) per dry ton of solids. In place of these acids, a similar amount of ammonium chloride ($NH_4Cl$) may be used in place of the HCL and/or HCL—HF. Line 136 delivers the output from a backup centrifugal pump 138 either back to the mixing tank 130 for repetition of the above described cycle or directs it to the blender tank 140, which includes a blender unit 142 and which is supplied with hot water, for example, sea water at 80° C.

In the blender tank 140, ¼ pound of glycerine per ton of dry solids is added to the mixture and the drain valve 144 is used to remove any sand and shells accumulating at the bottom thereof. From the blender tank 140, the top layers of material pass through valve 146 and through line 148 to a slow speed classifier 150 which is equipped with line 152 for supplying air from a source 154. Classifier 150 operates on known principles and serve to provide a further separation of sand and shells, removing all those entrapped on a 20 mesh screen.

Thereupon, the float is passed through line 156 into flotation tank 158, to which a detergent and air, $O_2$, $O_3$ etc., performs a further separation with the organic and composite fines floating and the sand and shells sinking for eventual collection and removal from the bottom of the tank 158 through valve 160. Next, the material passes through line 162 to the oxidizer tank 164, which, like the preceding tanks, is kept between 70°C. and 80°C. Oxidation is carried out in tank 164 by the addition of a suitable oxidizer, in this case, chlorine ($Cl_2$) until saturation at about 70°C. is achieved. This causes near total cleaning of organics from inorganics and partial oxidation of the organic or composite metal-containing materials present and removes additional organic "dirt," it being understood that solubilities of the materials undergoing oxidative change are altered somewhat, and that the oxidized organic materials other than those containing the metal values may either be precipitated out or rendered more soluble, with removal thereof being facilitated in either case.

After treatment in the oxidizing tank 164, the composite material is passed through line 166 into a second hydrocyclone or other separator 168 for removal of still finer mesh inorganic materials, including those which have passed through the 20 mesh screen. Following this step, the organic material is passed through line 170 into the flocculating tank 172 to which flocculant and thickner are added, preferably in the ratio of ¼ pound each per dry ton of solids. Sodium aluminum sulfate or other alum or the like, or other known flocculant, is suitable for this purpose, as is a commercially available flocculant such as "Dow MGL," a product of Dow Chemical Co., Midland, Mich. The liquid then decanted from the tank contains soluble products, and this liquid is removed through line 174 to the scrubber tank 176 (FIG. 2B) for purposes to be described in further detail herein. Line 178 removes flocculated material in the form of solids and pulp, directing them through pump 180 through an intercooler 182 and into line 184 for addition to the cyclone 186, for further removal through drain 188 of any then remaining sand, shells, or other inorganic material, it being understood that certain of these inorganic materials remain entrapped until after chlorination in spite of the various steps previously carried out for removal of the major portion of these inorganic materials.

In fact, by reference to the descriptions of the previously outlined steps of the process of this example, it will be apparent that a major function of these foregoing steps is to insure maximum separation of the organic or composite materials having the precious metal values therein from the inorganic materials associated therewith. This portion of the process is important since the organic material often exists only as a thin surface coating on the sand, shells, rutile, magnetite or other insoluble minerals, and is sometimes trapped in the interstices of these or other inorganic materials. In any case, the separation must be effective for maximum yield, because the maximum quantity of starting material should be used and because the density per se of the organic material is considerably less than the density of the inorganic having a coating of the organic or composite material thereon. The importance of this fact may be appreciated when it is understood that one primary process of material separation used in carrying out the invention is a gravity separation depending on differences in the densities of materials to be separated.

From the cyclone separator 186 the pulp material is directed through line 188 to a lower temperature or cold chlorinator 190 which is maintained at about 20°C. and where additional chlorine is added to saturation. From this cold chlorinator 190 the chlorinated material is furnished to a precombustion mixing tank 192 which includes a motor 194 and an agitator 196, and wherein an oxygen carrier contained in storage means 198 is added to the pulp in a ratio of 30 percent of the dry pulp solids. Preferably the oxygen carrier or oxidizing agent is potassium chlorate ($KClO_3$), potassium perchlorate ($KClO_4$) sodium chlorate ($NaClO_3$) sodium perchlorate ($NaClO_4$) or the like. Thereupon, the composite material with an oxygen carrier or oxygen bearing product associated therewith passes through line 200, for subsequent combustion, as will now be detailed.

Referring now to FIG. 2B, the remainder of the apparatus for carrying out the modified process of the invention is shown in diagrammatic form. FIG. 2B shows a fuel reservoir 202 and a feed line 204, and shows that both lines 200, 204 are directed to a mixing area 206 served by a combustion air blower 208. Within an elongated combustion chamber 210 and downstream of the mixing area 206 are three combustion zones, each diagrammatically identified in FIG. 2B, incorporating a screw kiln 187, or the like, for roasting the downflow 188 of cyclone 186, after 3 percent oxygen carrier has been added, in blender 191, via conduit 193. Kiln residue 189 comprises fine silica sand as a by-product.

Within the mixing area 206 are a conventional burner nozzle, and an air supply, and the lines or pipe 200, 204 furnish to the burner nozzle a mixture of the combustible oxidized composite material which includes its associated oxygen carrier and an auxiliary or supplementary fuel which may be selected from various grades of fuel oil, natural gas, or the like, or mxitures thereof. In other words, a burner (not shown in detail) is disposed for receiving the organic material, its own associated oxygen in the form of the oxygen carrier material, an auxiliary or secondary fuel, and a supply of $O_2$ or air for furnishing combustion oxygen.

In the event that the original ore material is difficult to oxidize, or is relatively low in fuel value, even when associated with its oxygen carrier, a relatively larger amount of secondary fuel is needed, whereas, in other cases, less additional fuel or no additional fuel is required, since sufficient fuel value is available for production of ash material rich in noble metal values and for substantially total conversion of the organic portion of the composite material to gaseous or volatile materials. In the illustrated embodiment, for example, the fuel added may be in the form of about 3 percent oil and 8 percent natural gas, both by weight in relation to the total dry weight of solids in the composite or pulp material. In the preferred form of apparatus shown in FIG. 2B, the combustion chamber 210 is disposed within a tank 212 which serves, among other things, as a heat exchanger, with fresh water being fed from water supply 214 through coils 216 and into line 108. The other end of this line 108 serves the supply drum 106 (FIG. 2A). The combustion products emerging from the combustion chamber 210 are directed through conduits 216, 218, respectively, to dry flyash recovery tanks 220, 222, 224, and ultimately to the wet ash or scrubber tank 176 for metal value recovery.

After leaving the combustion area, the more dense combustion products and those containing the larger sized particles of ash residue pass through line 218, from which they are directed into the first dry ash recovery tank 220 at a tangent thereto for assistance in separation. An upper outlet line 226 joins the conduit or shunt line 216 which contains the higher velocity portions of the stream and those having more finely dispersed flyash therein. Combustion products including both gases and solids entrained therein are thereafter directed successively to dry ash recovery tanks 222 and 224. The inlet 228 to tank 222 is disposed at tangent thereto for inducing a vortex flow pattern in the tank 222. Line 230 connects tank 222 to a tank 224, and gases entering by way of line 230 flow into tank 224 and exit into plenum 232 which is in communication with tank 224 by way of a cylindrical filter 234, which is preferably a fiberglass matting material, and which is preferably provided with a mechanical vibrator or shaker unit for producing a self-cleaning action and to maximize dry ash recovery in tank 224. Gases, condensed fine elemental metals, oxides and salts then pass through line 236 into the scrubber tank wherein a porous bag 238 containing coarse rocks 240 are suspended, and from which the gases less particles are directed through vent line 242 by blower 244 and ultimately to the atmosphere through flue 246. Accordingly, the air is pushed in one portion of the apparatus by the blower 208, and velocity is maintained by the suction produced by blower 244. In another form of apparatus, a second scrubber tank such as the tank 176 may be provided, it being understood that the number of flyash recovery tanks, scrubber units, etc., actually provided depends on the size and location thereof and upon other factors which are known to those skilled in the art and which do not form a necessary part of the invention per se.

The circulating pump 248 causes the scrubber solution, which is typically 50 % HCl, with minor portions of $HNO_3$ and $H_2SO_4$ HF, from condensed gases to be sprayed over the rocks 240 for fines recovery. Line 250 provides for recirculation, and makeup line 252 communicates with removal line 174 (FIG. 2A), since the effluent from the flocculating and dewatering tank 172 is used for acid makeup schematically shown at 254. It will be noted that the flyash is recovered by removal thereof from the drains 256, 258, 260, 262 of the respective dry ash recovery tanks 220, 222, 224 and the wet ash scrubber tank or tanks 176. The dry ash provides a major portion of nickel iron palladium, copper and silver, while the scrubber or wet ash provides primarily gold and silver values, together with platinum, osmium, molybdenum and iron.

Referring now to the recovery of metal values from the ash, most noble metals are present as fine elemental particles, certain metals are present in the ash as reducible oxides, and others are present as oxides which cannot be reduced readily. Nevertheless, the entire output of all the dry ash recovery tanks 220, 222, 224 is combined with the output of the scrubber(s) 176, and this ash is mixed with fixed carbon, such as coal, in a proportion such that 11 percent fixed carbon, based on the dry weight of the ash, is provided. This combined material is then thoroughly mixed and briquetted (Typically 70 percent ash, containing silica, copper, iron, zinc; to which is added 16% KCl, (potash), 5 percent borox, 3.9 percent copper, .1% $Na_2S$ solution, 1 percent zinc and 4 percent carbon.) so as to be suited for melting and reduction in an arc furnace, with the other salts and oxides and the like serving as the flux. Upon reduction and liquefaction of the heated mass, the slag layer is poured slowly into a dilute leaching solution to bring about fracturing or subdividing of the slag and incidental pre-heating of the leaching solution prior to evaporating the acids and concentrating the ions in the acid solution. The fractured slag is then preferably rod milled to about 100 mesh or finer particle size before complete or final leaching.

Following removal of the slag, the melted metal is tapped into molds and cooled, whereupon it may be treated by conventional methods, such as those described elsewhere herein, for refining and further individual metal value recovery. The principal metals recovered include silver, gold, platinum and copper, etc., the base metals having been reduced from their oxides to elemental form by the carbon in the arc furnace. Uranium oxides, including $UO_2$, $UO_3$, and $U_3O_8$ may be recovered by nitric acid leaching from the slag, the uranium oxides not being reducible as readily as the other metals under these conditions.

Other oxides, as well as uranium oxides, which are present in the ionic form in the nitric acid leaching solution may be concentrated by acid evaporation, and thereafter recovered by various methods which do not form a necessary part of the present invention, namely, electrolytic precipitation, or the use of ion exchange resins for cation recovery, or extraction with solvents, such as the use of pure or mixed ketones, etc., or by the full evaporation of the acid.

Referring now to the slag itself from which certain values were recovered, the remainder of the slag itself normally consists principally of salts and base metal oxides such as aluminum oxide ($Al_2O_3$), silica ($SiO_2$), and titanium dioxide ($TiO_2$), all of which are not reduced during reduction of the previously created metal oxides in the furnace.

Reference will be made elsewhere herein to the method of recovering metal oxides, such as the uranium oxides referred to above, and other metals from this slag.

Although the present invention is not intended to be limited to or to depend on any one theory of operation or any particular physical or chemical mechanism, it is believed to be significantly different from knowm prior art methods. Therefore, an understanding thereof may be facilitated by making certain assumptions and classifying or identifying some of the metals to be recovered as being adapted to undergo certain behavior when treated according to the general method of the present invention.

For example, most if not all of the gold in soluble form will naturally occur in the sea water itself, assuming that the ore originates from sea water, and the present invention is not concerned with this form of gold or other precious metal. In addition to this form of gold, and whatever gold may be present as relatively pure and relatively readily available insoluble metallic gold merely physically trapped in organic materials, there is believed to be present in the ores a large proportion of gold which is present as organo-metallic gold, that is, gold which is bound directly to the carbon atoms of an organic compound. In addition, it is thought that gold ions, including complex gold ions, may be ionically bound to carbon or to one or more functional groups of organic compounds. Furthermore, metallic and/or simple or complex ionic forms of gold may be fixedly held in relation to one or more organic molecules by a chelating or analogous bonding action. Furthermore, it is even considered possible that gold in one or more of the above forms, although not conventionally considered to be bonded or associated with an organic compound, even by relatively weak or practically no true covalent, coordinate covalent, or organic bonds, may be adsorbed, either chemically, physically, or both, on portions of one or more organic molecules, or may even be physically entrapped in a molecule or closely associated group of molecules, such as might be the case in a gel or molecular sieve. Accordingly, gold of this type may be relatively inaccessible from the standpoint of ordinary physical handling, i.e., even the relatively dense gold might form a portion of a large molecule having a relatively low overall or average density. Likewise, gold present in an organometallic form would possess different characteristics than free metallic gold or gold ions. Various complex ion forms of gold might also undergo reactions not characteristic of the more conventional forms of gold and would not react as would these more conventional forms to a given form of treatment.

Most of the above considerations set forth in regard to gold are at least partially applicable to other precious metals, some of which are relatively easy to place into ionic or complex form but relatively difficult to recover from such form.

Accordingly, all of the above gold or other noble metals and their compounds when associated in any way with organic materials, may be referred to generically herein, and in the claims, as "metal containing, composite materials," or similar expressions.

With the above in mind, it is thought that the frothing step of Examples 1-9 provides an easy separation of the organic component of the ore which contains the values sought to be recovered, and that the solvent treatment rids the organic layer of soluble organic material which is not sufficiently complex to hold significant quantities of metals, and incidentally cleans the other organic materials from closely held inorganic matter such as sand, shells, carbonates and the like, particularly in fine particle sizes, and allows such matter to sink to the bottom of the flotation cells. In this respect, one preferred characteristic of the water immiscible organic component is that it have a known "dry cleaning" effect, and, in fact, dry cleaning fluids have also provided good results when used with the process of the invention. Since the organic solvent is recirculated in large part in the apparatus of FIGS. 1A and 1B, and such solvent is not significantly miscible in water, any precious metal which is incidentally actually trapped therein, asby solvent action, if present in significant quantity, can be recovered by subsequent treatment. The step comprising oxidation of the composite material following recovery of the solvent is believed to oxidize those "activated" or otherwise attractive carbon or other sites on the organic molecule, and, by changing them chemically, is believed to render them unattractive, or unable to bond, gold, gold ions, gold complexes, or to attract the gold by chelation, adsorption or other, perhaps insufficiently or improperly understood phenomena. Although, as pointed out above, these statements rest on certain assumptions, and are not to be taken as forming any part of or in any way limiting the invention, it appears possible that such mechanism may be responsible for the success of the process of the invention.

In the process illustrated in Examples 1-9, the spontaneous ignition of the oxidized composite metal-containing material affords an advantage of the invention in that the materials emerging from the second dryer are presented in a dry powder form from which they may be recovered by a simple, straightforward process. In this manner, simple arc furnace reduction and purification may be used, and cyanidation may be avoided, as may ion exchange, solvent extraction, and the like. The present invention does not relay on the use of dangerous materials, such as sodium cyanide or the like. The reasons for the spontaneous ignition of the combustible oxidized composite materials referred to in Examples 1–9 are not fully understood, but it is thought that a by-product of oxidizing the organic material may be to create rearranged or new products, including metal compounds, which are combustible, either alone or in combination with the other products present; and/or with any residual oxidizing agent which may be present.

From the foregoing discussion of certain of the features of the process of Examples 1–9, inclusive, and from a comparison therewith of certain steps of the process of Example 10, it can be seen that, broadly speaking, the process may be divided into a few principal steps. The first important step is the separation of the sand, shells, and like inorganic material from the organic or so-called composite materials which include the precious metals, rare earths, and other like values therein. This may generally be referred to as the separation process.

The second important step is the combustion preparation step, which includes the use of any one or more individual or combination of individual oxidizing agents, and which also includes the addition, where necessary, of a fuel material, with or without its own additional oxygen. The object of this step is to insure that, upon combustion, there will be adequate combustible material as well as adequate oxygen to insure complete combustion, and, more particularly, combustion of the type which is adapted to bring about the production of elemental metals and reducible oxides and salts of all the metals sought to be recovered in oxide form.

The next principal step is the combustion step, wherein the composite material, with or without the additional fuel and with or without an additional oxygen supply, is burned under conditions adapted to bring about conversion of the organic portions of the burned material to volatile products which are permitted to escape and to bring about production of metal oxides which are recovered as ash, such production being preferably carried out simultaneously with the production of slag materials, and wherein both dry and wet separations are made to insure maximum elemental metal, salts and oxides, and slag recovery.

The last principal step is the reduction and/or separation of the oxides and metals, which is preferably carried out by reducing the oxides in the presence of a slag material, and thereafter separating the metals from each other. However, it is also possible to separate the oxides from each other prior to reduction thereof. In this connection, it will be noted that, in some cases, the dry ash may be processed separately from the wet or scrubber ash, and that, in other cases, all of the ash may be processed together.

Referring again to the first principal process step, namely the separation of the organic from the inorganic materials, certain additional examples will herein be set forth wherein different materials and apparatus are used to accomplish this purpose. However, before setting forth examples of the various ways in which this process may be carried out, it will be understood that, in general, the process relies upon the affinity of portions of the organic products for an organic solvent, or for a portion of a detergent or surface active agent or the like, while, in other cases, the separation takes place partially by physical abrasion. It will be understood in this connection that the organic or composite materials are often present in the ore in the form of thin coatings on small bits of sand or shells, and that consequently, finely subdivided materials such as fine sand or other inorganic materials have the capacity to retain on their surfaces relatively large quantities of such adsorbed organic materials.

Accordingly, this phase of the process may be generally thought of as one wherein the chemical or physical action is adapted to be one of removal of the organic components from substrates to which they may be attached, as well as, in part, a density separation and a separation based on the general tendency of the organic materials to be relatively more soluble in an organic, water immiscible phase than in the water itself. Since separations of this kind customarily depend also on the fact that the organic components are characteristically of lighter density than water, particularly salt water, it is also helpful to reduce the overall density of the organic product by entraining therein certain amounts of gases or air, as by frothing or the like. In addition to the aforesaid chemical and physical separation, it is also possible to remove adsorbed layers of organic material from inorganic substrates by the application of ultrasonic energy.

Referring now to the oxidation steps, it will be understood that, in spite of the foregoing separation steps, the organic material will have associated therewith a certain amount of inorganic materials, as will now be set forth. The "float" or organic-containing material is in the form of a pulpy semi-solid or pulp which may typically consist of about 2 percent of metal oxides, most of these being insoluble in water but entrained or entrapped within the organic phase. Metal chlorides, other than silver chloride, are generally soluble and remain in solution, and therefore comprise only a negligible portion of the pulp. In a typical pulp, about 3 percent thereof consists of metal chelates, where two or more carboxyl groups are typically present and serve to bond metal thereto in a well known manner. Typically, the organometallic materials or those wherein the metal is directly bonded to the carbon account for about 20 percent of the float pulp. These organometallic compounds are very numerous and varied, since a number of metals are present in various compounds and since the organic portion of any of the molecules may vary considerably. It is believed possible that some 500 to 800 such compounds may be present in typical ores.

Since the float pulp contains about 50 percent solids, about 47 percent is customarily water and about 3 percent various soluble salts, principally sodium chloride. The remainder of the pulp is typically comprised of basic metal oxides, including aluminum oxide, silica, titanium dioxide, and other less common oxides, including rare earths and their oxides, all of the above typically comprising about 25 percent by weight of the total float or pulp. In view of the foregoing, and particularly in view of the fact that the organic portions of the chelates and organo-metals may vary considerably with the source and composition of the ore, it is necessary that sufficient combustion of the desired type take place to fully volatilize all organic portions of the molecules, and to produce elemental metals, metal oxides and salts in a recoverable flyash form. In accordance with one view of the invention, it is necessary that sufficient oxygen be present when this combustion takes place to prevent the preliminary formation of excessive carbon or the like, particularly in the region of the metal, since it is believed that the formation of this material may impede or prevent oxidation of the metal as well as reduce heat transfer. For example, organometallic materials containing gold or the like, which have been subject to calcining or roasting in the presence of insufficient oxygen often become "graphitized" or refractory materials from which the metal components may not be recovered, or, if able to be recovered, may be recovered only with great difficulty. Accordingly, it is necessary to insure that the correct amount of oxygen is present, rather than too much or too little. This is normally insured by providing an oxygen carrier which is added to the pulp prior to combustion thereof, and which may typically comprise chlorates, perchlorates, or other various oxidizers, including oxygen, halogens, ozone, etc. In addition to consideration of the particular oxidant used, consideration must also be given to the total fuel value of the oxidized product. In the United States, a number of oxidized products made from the ore had a fuel value of about 4,000 to 6,000 BTU's per pound, which may be typical and which produces good results. On the other hand, however, an ore of different composition might have considerably less fuel value, and therefore, more oxygen must be added thereto in order to obtain proper burning thereof.

EXAMPLE 11

A process was carried out generally along the lines set forth in Example 10, differing therefrom only as follows. Instead of the amylase digestor and the detergents used in Example 10, about 1 pound of glycerine or 1 pound of "DOWFROTH 250" (Dow Chemical Company, Midland, Mich.) per ton of solids was used in the mixing tank 130, and about 1 to 5 pounds of hydrochloric acid per ton of dry pulp were added. This acid reacts with the calcium carbonate to produce $CO_2$ and thereby removes the calcium carbonate from the water, giving us our needed calcium chloride as well. From about 1 to about 5 pounds of fatty acid per dry ton of float or pulp were used in the flotation tank 158, with light petroleum distillates being used in the classifier 150. In other respects, the process carried out was the same or substantially the same as that of Example 10.

EXAMPLE 12

A process similar to that carried out in example 10 was used to produce the desired metal oxide values, except that, in the preliminary separation stage, after elutriation of the ore to the desired solids percentage, and after addition of hydrochloric acid to eliminate calcium carbonate and produce calcium chloride, the particles of sand, shells, and the like were cleaned by the application thereto of ultrasonic energy while in water, this step being carried out in a tank (not shown) of known construction. As pointed out above, this method is suitable for mechanically removing organic residues from inorganic material. When separated in this manner, the organic product is suitable for further separation, as in the classifier 150, and in the flotation tank 158, to which air is added to assist in forming a froth for separation. In this case, the separator 134, which will be described in detail herein, may be eliminated, since the mechanical action afforded thereby is substantially the same as the mechanical agitation furnished by the ultrasonic energy source.

EXAMPLE 13

A process was carried out substantially in the manner set forth in Example 10, except that, in addition to the chlorate, perchlorate or other so-called oxygen carrier or oxidizing agent added to tank 192, hydrofluoric acid (HF) is also added, with the ordinary oxygen carrier being present in an amount of 10 lbs. per ton of pulp (dry weight basis) and the HF also being added in the amount of 10 lbs. per ton or less. In such a case, in view of the strong oxidizing characteristics and potential explosion hazard of these materials, the tank 192 is preferably surrounded by a woven jacket of steel cables of a one-eighth inch diameter size. The results of this method were similar to the results obtained by using the methods described in the foregoing examples.

EXAMPLE 14

A method similar to that set forth in Example 10 was carried out, except that the oxygen carrier was selected from a group of known oxidizing agents including potassium nitrate, sodium nitrate, hydrogen peroxide, nitric acid, nitric oxide, calcium chlorate, calcium nitrate, ammonium nitrate, liquid oxygen, and ozone. These materials were found to be useful in ranges of from about 1 or 2 lbs. per ton up to 30 or 40 percent of the dry weight of the ores, depending on the composition of the ores. Furthermore, these materials operate in various combinations as well as individually. However, the chlorates and perchlorates are generally preferred because of economy and ease of handling, a portion of the economy of use thereof resulting from the fact that certain chlorates and perchlorates may be made by using chlorine and other byproducts of the principal process.

EXAMPLE 15

A method such as that described in Example 10 was carried out except that, following the dewatering of the composite material to a concentration of about 50 percent solids, chlorine is added at the rate of 5 lbs. per ton of dry solids. An important feature of this particular method is that the chlorine is added in the clathrate or inclusion complex form ($Cl_2 \cdot 7.3H_2O$, for example). As is well known, the clathrate form is one wherein a normally gaseous material such as chlorine is held in association with a inter-intra-molecular lattice so that the gas may be handled as a liquid, even though, when reaction conditions are present, the chlorine or other gaseous material is chemically free to participate in the reaction. Such a form is produced by bubbling chlorine through a dilute calcium chloride solution which produces clathrate crystals which are stable for a long enough time to facilitate handling for purposes of the invention. In use, it is believed that the composition of these crystals probably varies between seven parts of water for each mole of chlorine up to about 20 parts of water for each mole of chlorine.

Whether providing the chlorine in the inclusion complex form or otherwise, it is also possible to add some or all of the oxygen in this form, the oxygen being held or fixed by beta-quinol (*p*-dihydroxybenzene) or beta-quinol and urea. The beta-quinol, alone or with the urea, also forms a clathrate or inclusion complex for temporarily "holding" the oxygen for use in the process. In this connection, a typical pulp as treated in any of the foregoing examples not specifically reciting a different proportion thereof should preferably use 11.4 pounds of oxygen per ton of pulp and 6.4 pounds of chlorine per ton of pulp.

As an alternative, or in cooperation with the foregoing described methods of supplying oxygen to the pulp for combination therewith to produce the combustible, oxygen carrying composite material, pure oxygen may be bubbled through the precombustion mixing tank 192. In some cases, in accomplishing this, it may be necessary to raise the pressure from atmospheric pressure up to about 4 atmospheres (gauge). In the event the ores prove less reactive, or other conditions are present tending to reduce the rate or degree of reaction between the pulp and the oxygen, moderately to considerably higher pressures may be required to be used. One advantage of using the quinol or urea-quinol system is that the requirement for pressure may be reduced or eliminated, although this is not strictly necessary.

As a further alternative to either of the herein described forms of oxygen addition, ozone may be provided for addition to the pulp at the mixing tank 192. Ozone is advantageous in that it is highly reactive, although it is known to be an expensive method of supplying oxygen.

When the oxidized pulp material is supplied to the burner along with the additional fuel material, it is preferred that the additional fuel be discharged, sprayed or atomized so as to surround the flame caused by ignition of the oxidized pulp, and it is also preferred that this secondary fuel be supplied with a second source of oxygen, usually merely air from the atmosphere propelled by the blower 208. In this manner, the auxiliary fuel serves as an "envelope" around the primary flame and maintains the temperature at the burner at a high level. The primary fuel is preferably forced through a nozzle at a high pressure so as to be atomized, while the manner in which the secondary fuel is supplied to the combustion zones also depends at least to a certain extent on the nature of the fuel, i.e., whether it is oil, gas, or a mixture thereof, etc.

Referring now to the combustion process, although the invention is not intended to be limited to any particular theory of general operation or particular theory of combustion, it is believed that combustion in the burner may occur somewhat along the lines set forth below.

Since chlorine will react with some organic materials to produce HCl and carbon monoxide in the presence of available carbon and oxygen, it is thought that chlorine and oxygen may react with oxygen-containing organo-metallic materials, such as an oxidized organo-metallic gold material, to produce HCl, water vapor, carbon monoxide, and an organometallic material having a reduced carbon chain length and chlorine replacing some or all of the oxygen. Furthermore, free chlorine and oxygen may react with organo-metals such as gold, palladium, or like organo-metals to produce salts, oxides and volatile hydrocarbons and chlorinated hydrocarbons. Gold or other like metal values which may be present in chelated form, particularly in forms chelated by amine or acid groups, may react with chlorine and oxygen under these conditions to produce gold or like salts and oxides, nitric oxides, carbon monoxide and HCl and water vapors. Furthermore, the first combustion zone may involve certain other less important reactions including those involving sulfur, nitrogen, and the like. Metals already oxidized, namely, alkaline earth metals or other base metal oxides, such as aluminum oxide and the like, are fully oxidized and do not react, but are merely carried along or entrained in the combustion gas stream for separation as solids and for eventual use as slag materials in the ultimate metal recovery process.

In the middle or second zone of the flame, (FIG. 2B) it is possible that perchloric acid may be formed from the hydrochloric acid and the sodium perchlorate formed from sodium chlorate in the first flame zone.

In the last or third flame zone, any remaining organic material is believed to be converted to inorganic oxides or salts, insofar as inorganic material is present, with the remainder of the organic materials forming gases. Those metal atoms which were present in organo-metallic form are normally converted to oxides, salts, or elemental metals, while carbon is converted to carbon dioxide and hydrogen is converted to water vapor. Other reactions may include the reaction of some hydrogen with free chlorine or oxides to produce various chloric, chloride, sulfur, nitrogen, and phosphorous acids which are vaporized and which may thereafter be recovered from the scrubbers. In this connection, it will be understood that, by reason of the natural occurrences of the ore materials, and the less than perfect separation of inorganic materials, minor amounts of sulfur, other halogen, phosphorous, etc. are present to take place in these side reactions.

EXAMPLE 16

Referring now to a method similar to that described in Example 10 above, but differing therefrom principally in the method of recovering the metal values from the ash, a separation may be carried out as set forth herein. The preliminary steps, such as the separation and oxidation steps, are carried out as set forth in any of the foregoing examples, except that in the mixing tank 192, up to 20 pounds per dry ton of pulp of a zinc salt is added to the material. Preferably, the salt is selected from the following: $Zn(ClO_3)_2 \cdot 4H_2O$, $Zn\ Cr_2O_7 \cdot 3H_2O$, $Zn(MnO_4)_2 \cdot 6H_2O$ and $Zn(NO_3)_2 \cdot 3H_2O$. In addition, metallic zinc is placed in the solution at the bottom of the scrubber tank 176, and in the dry ash tanks 220, 222 and 224. At least 1 pound per ton of a soluble cupric salt should be added to the tank 192. Such a salt is preferably one of the following: $Cu(ClO_3)_2 \cdot 6H_2O$, $Cu\ Cr_2O_7 \cdot 2H_2O$, $Cu\ SiF_6 \cdot 6H_2O$ and $Cu(NO_3)_2 \cdot 3H_2O$.

Referring now to the effect of adding these materials the zinc is used to aid metal recovery, as will now be set forth. The ash is collected from the dry tanks 220, 222, 224 and from one or more scrubber tanks 176. The residue from the dry tanks is then mixed with the coal dust for briquetting as set forth above. The briquet to be reduced should contain 48 percent ash, 24 percent KCl or $NaCO_3$ (potash component for fluxing), 24 percent zinc and 4 percent carbon, the carbon having been added in the amount of about 8 to 10 percent of the weight of the ash. These mixed and compressed briquettes are placed in a graphite crucible 298 which is placed in the combustion chamber 210. The high temperatures in the combustion chamber 210 will result in sufficient heat to vaporize the zinc, while the thus vaporized metallic zinc will move downstream for eventual recovery in the ash tanks. A free flowing slag in the crucible 298 is produced by the addition of the potash (KCl — NACl — NaCO₃), which comprises about one-quarter of the weight of the briquets. The zinc is used as a so-called displacement material, in that any zinc metal present will undergo ionization and loss of electrons (oxidation) to salt from the metallic form, whereas the metal compounds and ion values will undergo reduction or gain of electrons to become elemental metals. This process is continuous after an initial start or "seeding" with zinc, provided the slag is removed from time to time. In the alternative, the process may be run on a batch basis, since it is apparent that materials for metal recovery must be fed to the combustion chamber for receiving economical heat, whereas these materials are not available until after the process has been operating for some time.

To summarize the preferred use of the graphite crucible and zinc metal recovery system just described, the first stage includes melting the ash and zinc to produce slag, metallic values and at least some metallic zinc. The second stage includes pouring the hot slag into water to produce fine slag particles, the third stage includes distilling the zinc metal into the ash collecting system, the fourth stage includes pouring the metal which remains after zinc distillation into a mold for subsequent refining and the fifth step is to process the crushed slag for extraction of uranium, rare earths, etc. by extraction with nitric acid and solvents such as ketones, all as generally set forth in one or more of the foregoing examples.

To summarize certain aspects of all of the foregoing examples, it should be pointed out that a number of auxiliary systems would normally be present in the commercial forms of the apparatus described in detail herein. In particular, an apparatus of the type shown in FIGS. 2A and 2B would normally have associated therewith a number of heat exchangers, and/or refrigerators, and salt, acid, and base makeup or mixing tanks, as well as the associated connections and fittings used therewith. Furthermore, such apparatus commonly includes a number of chemical systems for recovering spent materials for reasons of economy. For example, some scrubber acid may be neutralized by ferrous hydroxide. H₂S is produced in 164 and 190, collected and pumped to the scrubbers via pump 171 and pipes 174. Copper and other salts, where present, may be precipitated by sulfur which is present as H₂S or the like. Other apparatus, such as water treatment units, immersion heaters and so on are commonly present; however, a detailed description of these elements has been omitted inasmuch as they are not strictly necessary to the practice of the invention and because those skilled in the art are familiar with such elements and their use. H₂S can be stored in an activated charcoal chamber 173, for instance, and released upon heating.

Referring now to certain elements of the apparatus 104, one particular element which is helpful is the mechanical separator 134 shown in FIG. 3. This unit 134 includes a casing 264 having a pair of end walls 266, 268, each of which includes a plurality of radial grooves 270 (FIG. 3). A rotatable center shaft 272 is driven by a motor 274, and the shaft 272 includes first and second rubber or other flexible impeller elements 276, 278, with a center impeller-spacer 280 disposed therebetween. Inner margins 282, 284 respectively of the end walls 266, 268 define openings through which communication is respectively established from an inlet area 286 to the interior 288 of the separator casing 264, and from the interior 288 to a pump inlet tube 290. The pump assembly 292 includes a rotary impeller 294 driven by the shaft 272. The interior 288 of the separator 134 communicates with a sump 296 in which sand and other dense particles may accumulate. In the use of the separator 134, actuation of the motor 274 causes the shaft 272 to rotate, and a centrifugal force is applied by the impellers 276, 278 to the fluid trapped within the body. As the more dense particles tend to move radially outwardly of the housing 264, they are rolled or scrubbed by the rubber impellers 276, 278 along the faces of the end walls 266, 268, with the radial grooves 270 permitting inorganic particulate matter to escape therealong into the area of the sump 296. The less dense material proceeds generally axially of the separator 134, and through the outlet defined by the margins 284, inasmuch as a downstream low pressure area exists within the transfer pump 292. Accordingly, in use, the larger, more dense, inorganic parts of the mixture transferred by the separator 134 remain in the radially outer or sump portions of the pump unit, while the less dense, organic or organometallic compounds, salts, water, etc., proceed through the inlet 290, to the pump 292 and thence back to the mixer tank 140 or the like.

As noted in FIG. 2A, the sump 296 may be connected through line 298 to the storage bin 124 which accumulates sand and shells for eventual discarding. As pointed out above, the provision of the rubber impellers 276, 278 and the arrangement thereof so that the impellers rub against the faces of the end walls 266, 268 provides a mechanical rolling and scrubbing action which is the equivalent of chemical or ultrasonic separation of the organic portions of the ore from the inorganic portions thereof. Accordingly, this form of separator is preferred where ultrasonic or protracted chemical separation is not feasible for one reason or another.

Accordingly, it will be seen that the present invention provides a novel metal recovery method having a number of advantages and characteristics, including those herein pointed out and others which are inherent in the invention. It is contemplated that a number of modifications of the herein described process will be apparent to those skilled in the art and that such changes may be made without departing from the spirit of the invention or the scope of the appended claims.

I claim:

1. A method of treating ores comprised of metal-containing composite organic materials and associated inorganic materials to produce therefrom reducible metal oxides, said method including cleaning said inorganic materials with benzene, separating said composite organic materials from said associated inorganic materials by gravity separation in water, said organic materials floating on said water, removing at least the major portion of said benzene, and thereafter treating said composite materials with a predetermined amount of an aqueous solution of a perchloric acid oxidizing agent to produce a treated composite material, igniting said material and allowing substantially complete combustion thereof, and collecting the solid combustion residues of said material for subsequent reduction of a portion thereof to the elemental metals which formed the metal component of said composite material.

2. A method as defined in claim 1 wherein said metal-containing composite organic material includes gold and silver in complexed, chelated, and organometallic form.

3. A method as defined in claim 1 which further includes adding to said treated composite material a combustible organic fuel material and permitting combustion thereof simultaneously with said combustion of said treated composite material.

4. A method as defined in claim 1 wherein separating said composite material from said inorganic materials includes the step of adding detergents in combination with amylase to said ores while said ores are immersed in water.

* * * * *